No. 617,494. Patented Jan. 10, 1899.
J. F. PIFER.
GATE.
(Application filed Aug. 1, 1898.)
(No Model.) 2 Sheets—Sheet 1.
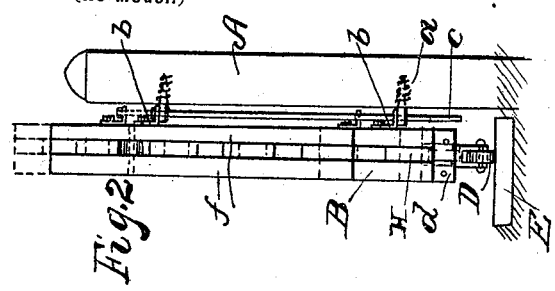
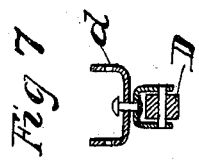
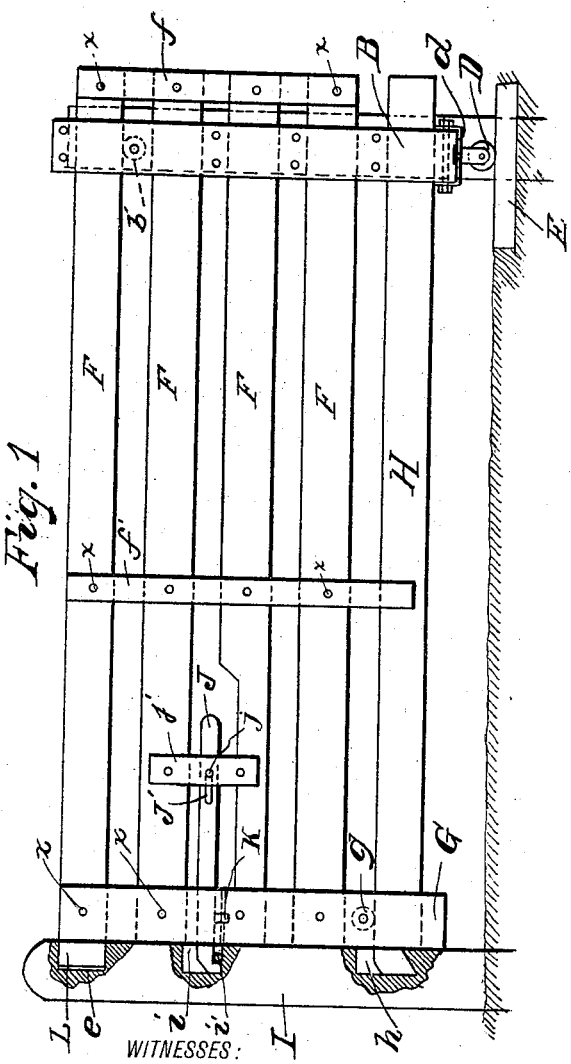
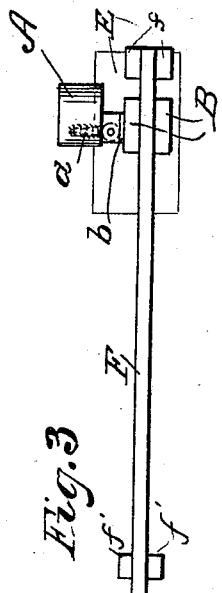
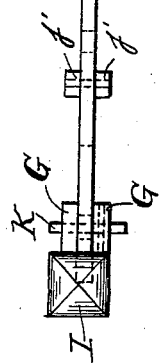
WITNESSES:
W. J. Brown
F. E. Gaither.
INVENTOR
John F. Pifer,
BY
J. M. Nesbit,
ATTORNEY.

No. 617,494. Patented Jan. 10, 1899.
J. F. PIFER.
GATE.
(Application filed Aug. 1, 1898.)
(No Model.) 2 Sheets—Sheet 2.
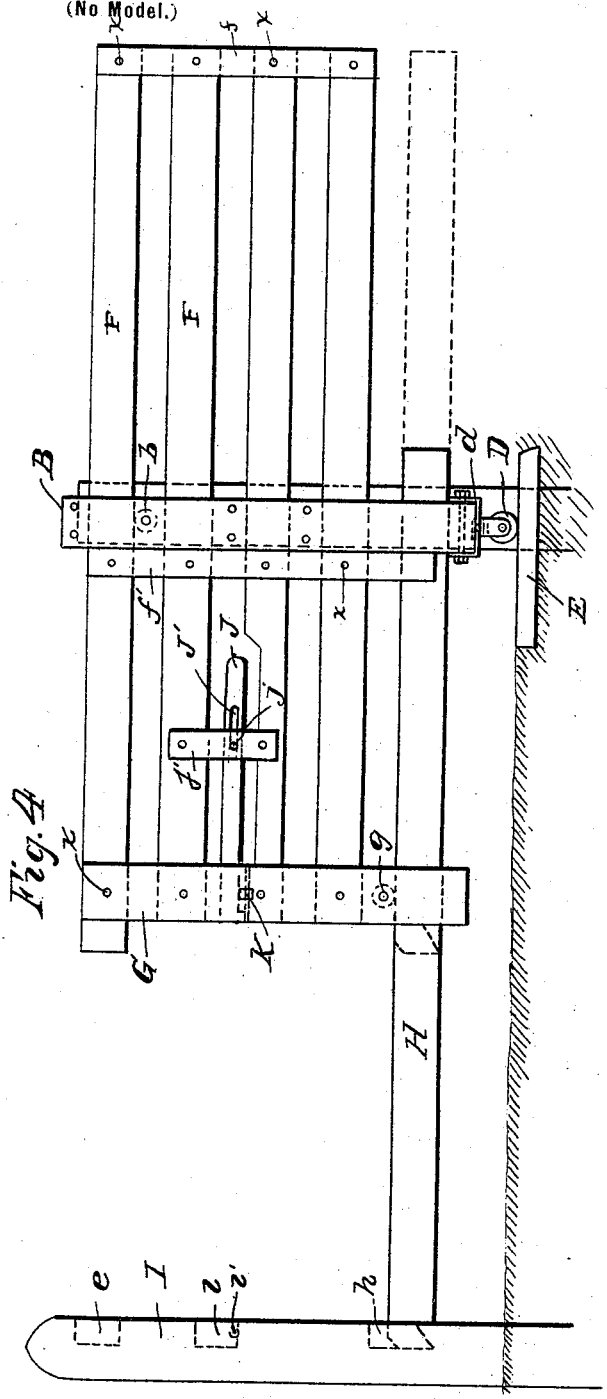
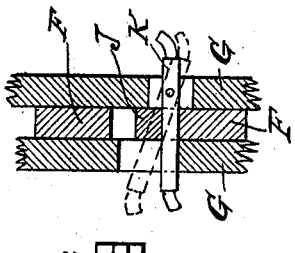
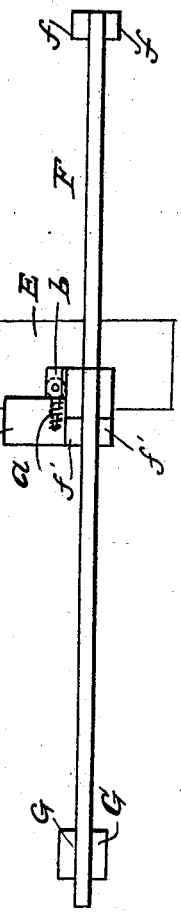
WITNESSES:
H. J. T. Brown
F. E. Gaither.
INVENTOR
John F. Pifer,
BY J. M. Keslit.
ATTORNEY.
THE NORRIS PETERS CO., PHOTO-LITHO., WASHINGTON, D. C.

UNITED STATES PATENT OFFICE.

JOHN F. PIFER, OF MANOR STATION, PENNSYLVANIA, ASSIGNOR OF ONE-HALF TO ARCHIE A. GILCHRIST, OF ADAMSBURG, PENNSYLVANIA.

GATE.

SPECIFICATION forming part of Letters Patent No. 617,494, dated January 10, 1899.

Application filed August 1, 1898. Serial No. 687,396. (No model.)

*To all whom it may concern:*

Be it known that I, JOHN F. PIFER, a citizen of the United States, residing at Manor Station, in the county of Westmoreland and State of Pennsylvania, have invented new and useful Improvements in Gates, of which the following is a specification.

This invention relates to a combined sliding and swinging gate of improved construction, and has particular reference to the gate-mounting for attaining the sliding movement, to the securing of the gate to its posts, and to the mechanism operating when the gate swings.

The invention consists in the novel features of construction and in the combination and arrangement of parts, hereinafter fully described and claimed, and illustrated by the accompanying drawings, in which—

Figure 1 is a side elevation of the gate closed. Fig. 2 is a rear edge view. Fig. 3 is a plan view. Fig. 4 is an elevation of the gate slid open on the lower track-rail, the rail being shown closed in solid lines and open in dotted lines. Fig. 5 is a plan view of the gate open. Fig. 6 is a detail view of the latch mechanism. Fig. 7 is a similar view of the caster.

A designates the hinge-post, from which the eye hinge-sections $a$ project, and B is a swinging upright, to which are bolted right-angle hinge-sections $b$, secured to sections $a$ by rod C. Upright B is mounted on caster D by means of angular clip $d$, embracing its lower end, and the caster rides on block or stone E, resting on the ground. The gate slides in upright B and also swings by the turning thereof, and the hinge construction just described permits of the gate being raised, as shown in dotted lines in Fig. 2, to clear snow-drifts and other obstructions, and by building up block E to support caster D the gate may be maintained in this raised position.

The gate proper consists of rails F, secured together at their rear ends by cleats $f$, at their center by cleats $f'$, and at their forward ends by cleats G. The rails and cleats are united at each intersection by a single bolt $x$, which constitute pivots to permit the gate to sag or change its angles, as may be necessary in conforming to the positions of the posts.

H is the bottom track-rail movable freely through upright B and cleats G and notched at its front end to hold in recess $h$ in latch-post I. This rail forms a track upon which the forward end of the gate moves, the movement being accelerated by roller $g$ between cleats G and roller $b'$ in upright B beneath top rail F. Rail H holds the gate proper and post B from turning; but when the gate is to be opened wide the rail is moved back, as indicated in dotted lines in Fig. 4, and the gate is then free to swing to position shown in Fig. 5. Rear end cleats $f$ terminate above rail H and do not interfere with its longitudinal movement.

The gate is secured to post I by latch J, slotted longitudinally at $J'$ to slide on pin $j$, connecting keepers $j'$, the notched extremity of the latch entering recess $i$ in the post and falling by gravity over cross-pin $i'$ therein. The latch is released by lift K, extending crosswise beneath it and pivoted to one of cleats G.

The top rail of the gate protrudes at L beyond cleats G to enter recess $e$ in post I, so that when closed the gate is held against vertical movement, which would release the latch; but owing to the construction described the gate can be opened only after first raising the latch, then sliding back the gate clear of the post.

Rail H constitutes a bottom extension for the gate, also a perfect support for its front end during the sliding movement, and holds it and upright B from turning. At the same time the rail is so near the ground as not to obstruct the passage of horses and cattle, and the latch having been pushed longitudinally back into the gate does not endanger the stock or catch the harness of horses passing through. For the passage of vehicles and farm implements rail H is moved back, and then the gate is free to swing to one side with upright B. The gate-posts frequently settle unevenly, and the pivots $x$ permit the gate to change its shape accordingly, and when raised to swing clear of obstructions its front end may be lowered to properly engage post I.

Having thus fully described my invention, what I claim as new, and desire to secure by Letters Patent, is—

1. The combination of a swinging upright, a gate supported at its rear end by the upright and slidable therethrough, a track-rail beneath and forming a bottom continuation of the gate, said rail supporting and guiding the gate when moving longitudinally, the rail holding the upright and gate from swinging and adapted also to slide back into the gate and swing therewith and with the upright, substantially as shown and described.

2. The combination of a hinged upright, a gate slidable therein, a latch-post, a track-rail forming a bottom continuation of the gate and upon which the gate moves longitudinally, the track-rail at its forward end removably engaging the latch-post to rigidly hold the gate and upright against turning, the track-rail being sufficiently low to permit stock to step thereover when the gate is slid open, and also adapted to be disengaged from the latch-post and swing laterally with the gate and upright, substantially as shown and described.

3. The combination of the gate proper, cleats G at its forward end and extending below the same, track-rail H forming a bottom continuation of the gate and embraced by the lower ends of cleats G and upon which the gate moves longitudinally, and a hinged upright through which the gate and rail move and with which they are adapted to swing, substantially as shown and described.

4. The combination with the gate and the lifting-latch, of the lift extending transversely through the gate beneath the latch and pivoted to one side of the vertical line of the latch, the lift being raised on one side of the gate and depressed on the opposite side when raising the latch, substantially as shown and described.

In testimony whereof I have hereunto set my hand in presence of two subscribing witnesses.

JOHN F. PIFER.

Witnesses:
  A. B. MILLER,
  J. G. KAYS.